United States Patent [19]
Lutz et al.

[11] Patent Number: 5,360,311
[45] Date of Patent: Nov. 1, 1994

[54] CAR CATCHER FOR A ROLL-OFF HOIST

[76] Inventors: Theodore A. Lutz, 2398 Rochester Rd., Sewickley, Pa. 15143; Frank K. Ludwin, Box 283, South Heights, Pa. 15081

[21] Appl. No.: 48,796

[22] Filed: Apr. 16, 1993

[51] Int. Cl.$^5$ .............................................. B60R 19/24
[52] U.S. Cl. ....................................... 414/494; 293/118
[58] Field of Search ................................ 414/498–500, 414/491–494, 474–476, 559, 480; 298/1 R, 156; 293/118

[56] References Cited

U.S. PATENT DOCUMENTS

| | | | |
|---|---|---|---|
| 3,164,371 | 1/1965 | Royle | 414/498 X |
| 3,913,963 | 10/1975 | Persicke | 293/118 X |
| 4,026,590 | 5/1977 | Holm | 293/118 |
| 4,305,694 | 12/1981 | Chan | 414/482 |
| 4,410,207 | 10/1983 | Scharf | 293/118 |
| 4,456,420 | 6/1984 | Newhard | 293/118 X |
| 4,516,902 | 5/1985 | Matson | 414/480 |
| 4,529,349 | 7/1985 | Lutz | 414/494 X |
| 4,968,097 | 11/1990 | Thomas et al. | 414/498 X |
| 4,988,258 | 1/1991 | Lutz et al. | 414/500 |

FOREIGN PATENT DOCUMENTS 2426552  12/1975  Germany .............................. 293/118

*Primary Examiner*—David A. Bucci
*Attorney, Agent, or Firm*—Clifford A. Poff

[57] ABSTRACT

A car catcher is pivotally mounted to an elevated frame structure of a roll-off hoist at an end which protrudes rearwardly from a vehicle beyond the rear wheels thereof. Chains establish a downwardly pivoted operative position of the car catcher by interconnecting the frame with the hoist. A pivotal latch lever moved by the same actuator used to raise the catcher from an operative to an inoperative position is positioned to a confronting relation with a jam lock to prevent unwanted lifting of the catcher from the operative position. The actuator moves the pivotal latch lever free and clear of the jam lock against the stop to allow, under control by an operator, pivotal movement of the car catcher to an inoperative position as desired during loading and offloading operations by the hoist.

10 Claims, 7 Drawing Sheets

CAR CATCHER FOR A ROLL-OFF HOIST

BACKGROUND OF THE INVENTION

1. Field of the Invention

The present invention relates to safety devices, and in particular to car catcher devices which are mounted to the rear of an elevated vehicle such as a truck to prevent the automobile or other vehicles from passing under an elevated truck chassis, flatbed or other structure which protrudes rearwardly beyond the rear wheels of the truck. More particularly, the present invention relates to such a car catcher device embodying a construction to prevent, in the operative position, movement to an inoperative position except at the will of the operator during necessary truck loading and off-loading operations.

2. Description of the Prior Art

Car catcher devices designated for the aforementioned purposes are known in the art. These devices are generally formed as a frame-like structure which is mounted, sometimes removably, to the rearwardly-protruding truck structure so as to downwardly depend therefrom. A portion of the frame-like structure is positioned at an elevation to receive impact from the front end of an automobile during a rear-end collision between the automobile and the truck.

Such devices function with great reliability when mounted to stationary truck structure which is always maintained in a generally horizontal and elevated position. However, the car catcher becomes nuisance when mounted to rearwardly-protruding truck structure which is capable of, and intended to be, periodically downwardly lowered to a position at or near ground level, such as, for example, the pivotable roll-off hoist structure disclosed in U.S. Pat. No. 4,529,349. If used on such pivotable hoist structure, a permanently mounted car catcher would be an extreme hindrance since it would severely limit the downward pivotability of the protruding hoist structure.

As an alternative, detachable car catchers could be mounted to such downwardly pivotable structures. However, a removable car catcher must first be detached before the protruding structure is pivoted downwardly and then must be reattached when the protruding structure is pivoted upwardly into its normal roadway transport position. For obvious reasons, such detachment and reattachment of the car catcher becomes a bothersome if not laborious task each time the pivotable structure is to be placed into service.

In our U.S. Pat. No. 4,988,258 there is disclosed a car catcher frame pivotally supported at the rear of a roll-off hoist for movement in an operative position established by the length of two chains to an inoperative position. It is disclosed to ensure that the catcher frame can only pivotally elevate from a lowered operative position at the will of the operator and not at other times, for example, on impact with an automobile that would otherwise defeat the purpose of the catcher. In this regard, while believed unlikely, the front bumper of a car colliding with the rear of the truck might jam beneath the cross bar of the car catcher in such a way that circumstances could allow further penetration by the car due to a raising of the catcher by a wedging action of the front part of the car between the roadway and the car catcher. The present inventions seeks to avoid such a possibility of involuntary lifting of the car catcher in an efficient and cost effective way.

It is an object of the present invention to provide an improved car catcher that is pivotally supported and latched in an operative position in a rearwardly extending part of a truck which protrudes rearward of the rear wheels and unlatched synchronous with movement of the car catcher to an inoperative position under the control of an operator.

SUMMARY OF THE INVENTION

According to the present invention there is provided the combination of a frame structure having first and second end portions and apparatus for substantially preventing passage of a first vehicle under the second end portion when the frame structure is a first substantially horizontal position, the frame structure being part of a second vehicle and the second end portion protruding rearwardly beyond rear wheels of the second vehicle, the combination comprising means mounted to the second vehicle for vertically pivoting the frame structure about a horizontal axis between the first substantially horizontal position and a second position in which the first end portion is upwardly inclined relative to the means for vertically pivoting and the second end portion is downwardly inclined, frame means attached to the second end portion, the frame means including a jam lock, means for positioning the frame into an operative position and an inoperative position, the means for positioning including a pivotal latch lever moveable by an actuator to position the frame means either into the operative position wherein the pivotal latch lever operatively confronts the jam lock or the inoperative position wherein the pivotal latch lever is remote to the jam lock, chain means interconnecting the roll-off hoist structure at the second end thereof and the frame means, the chain means and the pivotal latch lever when operatively confronting the jam lock maintaining the operative position and transmit collision impact energy imparted thereto by the first vehicle into the frame structure of the second vehicle.

Preferably the frame structure of the second vehicle includes a roll-off hoist and includes means mounted to the second vehicle for vertically pivoting the hoist structure about a horizontal axis between the first substantially horizontal position and a second position in which the first end portion is upwardly inclined and the second end portion is downwardly inclined.

By this construction and arrangement of parts at such time when the frame structure, e.g., roll-off hoist structure is in the first position and the frame means is in the operative position, the chains and stop means operate to assure the confronting relation between the pivotal latch lever and jam lock to substantially prevent movement of the frame means from the operative position by occurrence of a collision between the first and second vehicles, the frame means when positioned into the inoperative position permitting full downward inclination of the second end portion such that a distal end thereof is capable of being positioned substantially at ground level.

In the preferred form of the present invention the actuation used to raise and lower the car catcher frame also operates the pivotal latch lever. Stop members limit pivotal movement by the toggle to establish the confrontal and spaced relation with the jam lock.

BRIEF DESCRIPTION OF THE DRAWINGS

These features and advantages as well as other will be more fully understood when the following description is read in light of the accompanying drawings in which.

DETAILED DESCRIPTION OF THE PREFERRED EMBODIMENT

Figure 1:
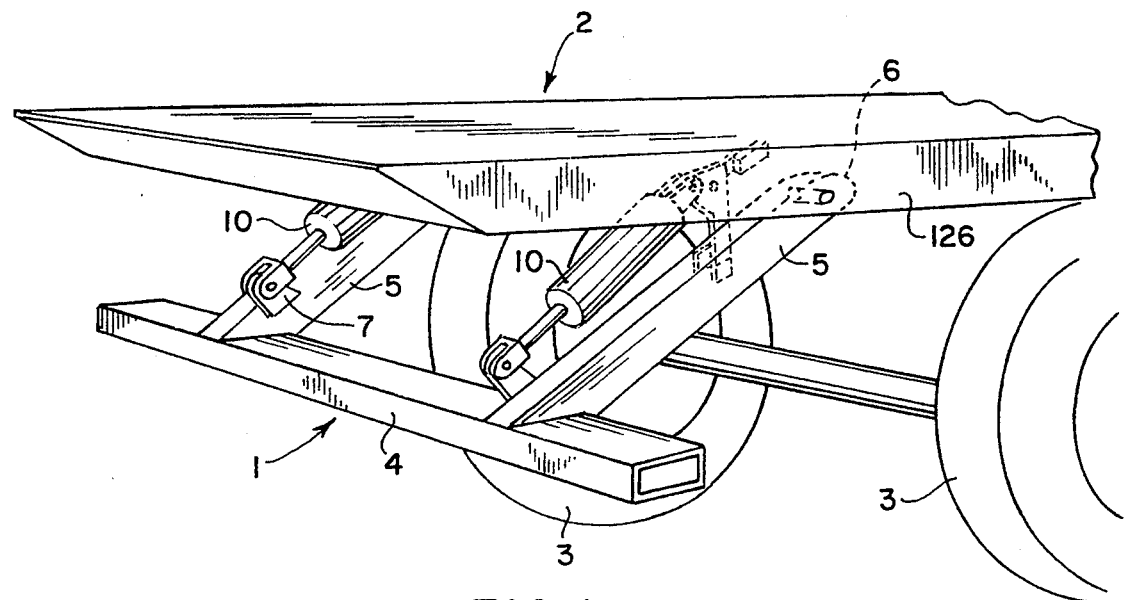
FIG. 1 is a perspective view of the car catcher of the present invention in an operative position and mounted to structure protruding rearwardly from the rear wheels of an elevated vehicle such as a truck.
Figure 2:
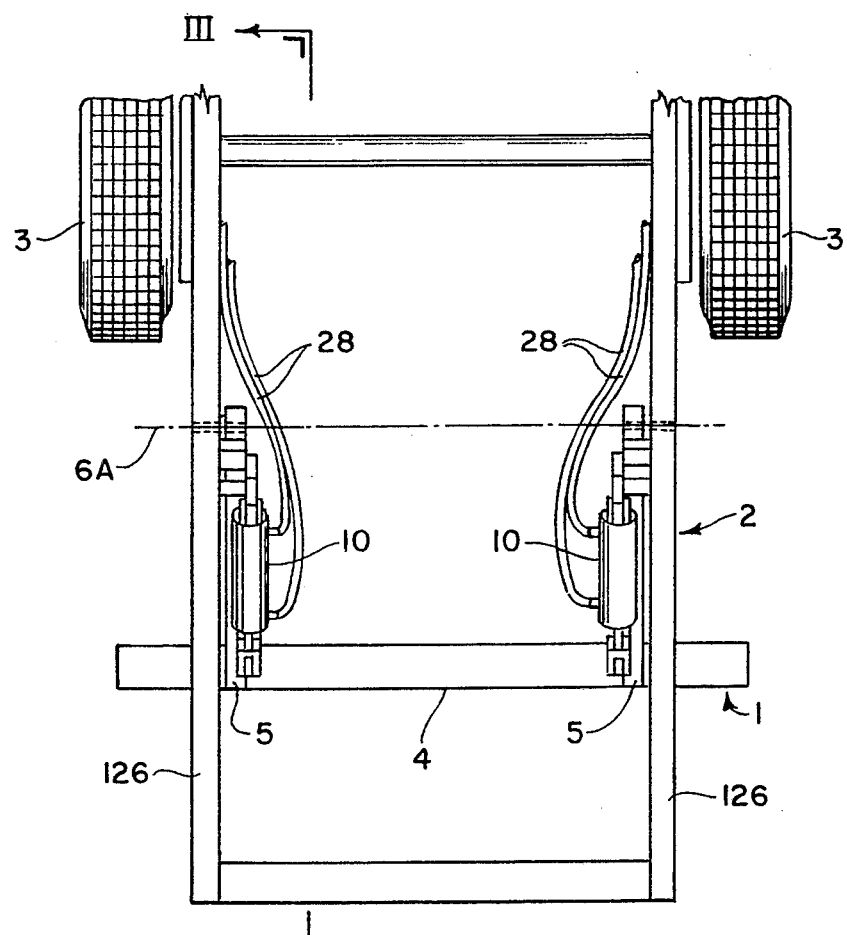
FIG. 2 is a plan view of the car catcher of the present invention with certain details of the truck to which it is mounted being omitted for purposes of clarity.
Figure 4:
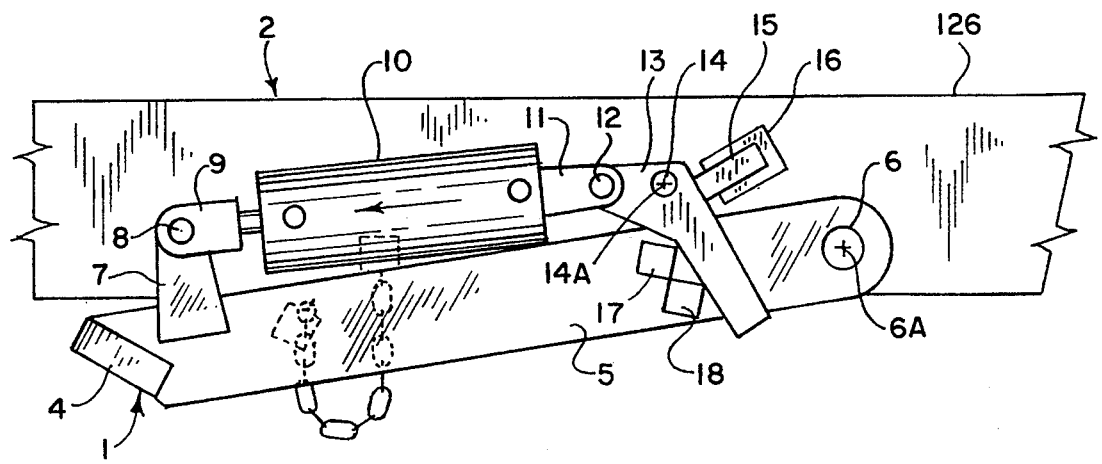
FIG. 4 is a view similar to FIG. 3 but instead illustrating the car catcher in an inoperative position.

In FIG. 1 there is illustrated the improved car catcher 1 constructed in accordance with the present invention and includes a frame structure mounted to an elevated structure 2 such as a chassis, a flatbed or, as will be described later, a pivotable roll-off hoist structure like that disclosed in U.S. Pat. No. 4,529,349 which protrudes rearwardly beyond the rear wheels 3 of a vehicle, e.g., a truck or the like.

Car catcher 1 includes a steel cross-bar 4 which is preferably formed as rectangular tubing but which also may be suitably formed as a box channel, solid bar, an angle member, an I-beam, or the like. Cross-bar 4 extends substantially transversely to the direction of travel of the vehicle. When in a lowered, operative position such as that depicted in FIGS. 1 and 3, the cross-bar is capable of receiving the impact from the front end of an automobile, or the like, during a collision therewith so as to prevent the automobile from passing under the rearwardly-protruding elevated structure 2 and to thereby at least reduce the likelihood of severe or even fatal injuries to the automobile passengers. When in the lowered, operative position the bottom surface of the cross-bar 4 extends substantially parallel to the ground surface.

Rigidly secured to cross-bar 4 and extending in a forward direction, i.e. toward the front of the vehicle, are a pair of spaced brace members 5. Also, preferably formed as rectangular steel tubing. Each of the brace members 5 is pivotally secured to a respective longitudinally-extending side member 126 of elevated structure 2 by a pivot pin 6. With such a construction it should now be appreciated that the frame-like structure of the car catcher apparatus 1 is vertically pivotable about substantially horizontal pivot axis 6A.

Figure 3:
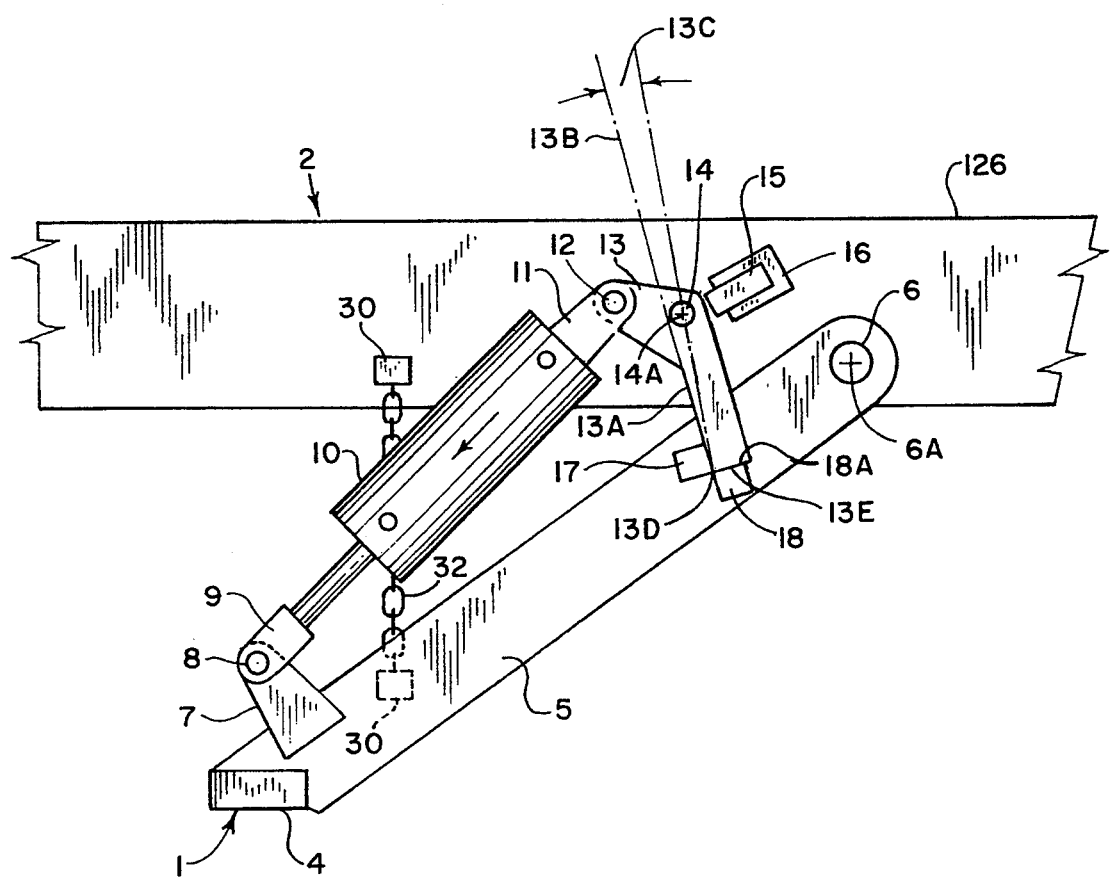
FIG. 3 is a view of the car catcher of the present invention as seen along lines III—III of FIG. 2, the car catcher being in an operative position.

Referring now to FIGS. 1-4, the top cover of the rearwardly-protruding elevated structure 2 has been omitted for purposes of better illustrating the improved car catcher of the present invention. A lever 7 is welded to the inside face surface of each brace member 5 to present, at the protruding end of the lever, a bored hole suitable for receiving a connector pin 8 pivotally securing a clevis 9 to the rod end of a piston and cylinder assembly 10. Protruding from the cylinder end of the piston cylinder assembly 10 is a clevis 11 which is secured by a connector pin 12 to a pivotal latch lever 13 which is in turn supported for pivotal movement about an axis 14A of a pin 14. The pin 14 is supported and extends from the sidewall of side member 126. Also supported by side member 126 is a first stop block 15 that is anchored by weld metal to a carrier base 16 which is welded to side member 126. Stop block 15 limits pivotal movement of the pivotal latch lever 13 in a forward direction of the vehicle while in the opposite direction, i.e., rearward direction of the vehicle, the pivotal latch lever will strike and abut against a second stop block 17 secured by weld metal to an inside face surface of brace member 5, when the brace member is in a lowered operative position through the application of fluid pressure to the piston fluid assembly 10 causing the rod end to be extended from the cylinder portion thereof. While two piston cylinder assemblies 10 each associated with stop blocks 15 and 17 and latch 18 are shown in the drawings, to control movement of the car catcher, it is within the scope of the present invention that only one such piston and cylinder assembly together with associated stop blocks and latch may be used. In FIG. 3, the arrangement of parts is such that a car catcher apparatus is pivoted about pivot pin 6 to a downward most operative position. Piston cylinder assembly 10 displaces a pivotal latch against stop 17. A sidewall 13A of the latch lever 13 defines in a plane 13B that forms an acute angle 13C with a plane passing through axis 14A and corner edge 13D between sidewall 13A and end face 13E of the pivotal latch lever. Angle 13C is typically between 1° and 5°, preferably 2°. This acute angle is important to the pivoting of the car catcher from the operative position shown in FIG. 3 to a retractive inoperative position shown in FIG. 4. The movement of end face 13E is such that it traverses a latch face 18A of a latch 18 about an arc whose center is axis 14A. The most radially extending edge is edge 13D. End face 13E due to the relationship established by angle 13C. At the instant of first displacement separate from latch face 18A which brings to a minimum any frictional contact between the pivotal latch lever and latch 18. When the end face 13E is remote to face 18A due to pivotal movement of the lever 13, the car catcher is moved by piston cylinder assembly 10 to an inoperative position. The lever pivots about pivot 14 until it comes to rest in seating engagement with stop 15. Once the pivotal latch lever is seated against stop 15, continued operation of piston and cylinder assembly 10 displaces the brace member 5 about pivot pin 6 in a direction raising the brace member into a nested-like relation partly between the side members 126.

The piston and cylinder assembly 10 may suitably take the form of a hydraulic cylinder, a pneumatic cylinder, an electrically powered screw jack, or the like. A power supply line 28, which may carry either hydraulic fluid, air or electricity, depending on the chosen type of extensible actuator, is connected to a suitable source (not shown) of pressurized hydraulic fluid, pressurized air or electricity.

Fixedly secured to each side member 126 is a block 30. Depending from each block 30 is a high-strength flexible connector such as chain 32. At its opposite end, each chain 32 is connected to a block 30 which is fixedly secured to brace member 5. High-strength cables may be used in place of the chains 32 if desired.

The purpose of the high-strength chains 32 is twofold. First, chains 32 act as a stop means to limit the downward pivoting of the car catcher 1. Second, they bear the brunt of the impact energy from a vehicular collision against cross-bar 4 and transmit this energy by means of brace member 5 to the elevated structure 2 where the energy can then be dissipated throughout the vehicle.

As noted previously, the elevated structure 2 may be any chassis, flatbed, or the like, which protrudes rearwardly beyond the rear wheels 3 of a vehicle such as a truck. However, a type of rearwardly protruding elevated structure 2 with which the present invention has particular advantageous use is a roll-off hoist structure such as that disclosed in U.S. Pat. No. 4,529,349. The structure and operation of such a roll-off hoist in combination with the car catcher apparatus 1 of the present invention is described hereinbelow with reference to FIGS. 5 through 16.

Figure 5:
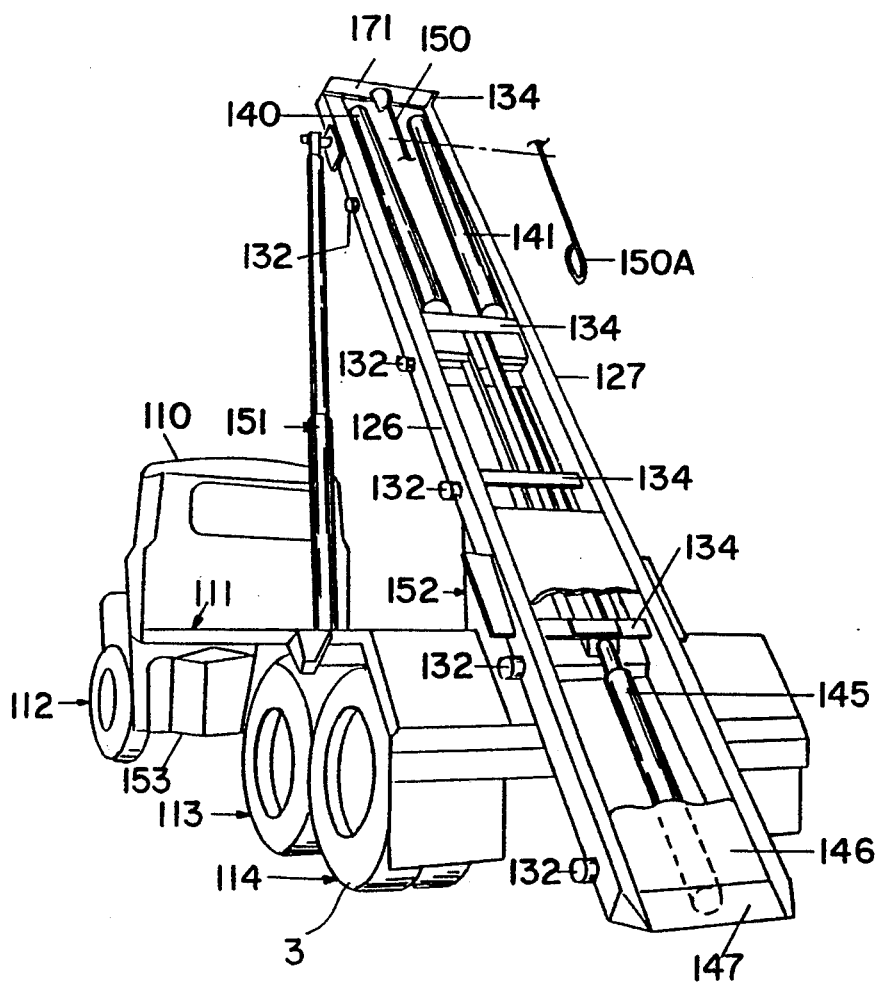
FIG. 5 is a perspective view of a truck having a vertically-pivotable, rearwardly-protruding roll-off hoist structure to which the car catcher of the present is particularly well adapted for use.

In FIG. 5 there is illustrated a vehicle of the type having a driver's cab 110 on the forward part of a chassis frame 111 which is supported by conventional steerable front wheel assemblies 112. The rear portion of the chassis frame is supported by tandem drive wheel assemblies 113 and 114. Other forms of vehicles may also be provided with the aforesaid roll-off hoist and the car catcher apparatus 1 of the present invention. One such vehicle is a trailer having a fifth wheel by which the trailer is driven and controlled by a tractor in a manner, per se, well known in the art.

As shown in FIGS. 8–11 the chassis 111 includes conventional spaced-apart and generally parallel chassis frame members 115 and 116 that are joined together at various locations by cross-members. An additional cross-member is an end plate 117 behind the frame members 115 and 116. A pivot pin 121 is supported in bores in the hinge plates 118 and 119 and in bores in spaced-apart, downwardly-extending lugs 122 and 123 of a hinge bar 124 (FIG. 9) that fit between plates 118 and 119. The hinge bar pivots about an axis along the length of the pin. Hinge bar 124 is secured to the undersurface of a slide carrier 125 at an aft portion thereof which preferably takes the form of a rectangular plate. The slide carrier 125 extends forwardly toward cab 110 from the hinge bar 124 between parallel and spaced-apart hoist rails 126 and 127 forming part of a hoist frame. Slide carrier 125 also extends rearwardly from the hinge bar 24 beyond the drive wheel assemblies 113 and 114 to form a rearwardly-protruding elevated structure 2 to which the car catcher apparatus 2 of the present invention is mounted. In particular, the car catcher is mounted to rear portions of the hoist rails 126 and 127. If desired the car catcher apparatus may also be mounted to the chassis frame members 115 and 116.

Figure 8:
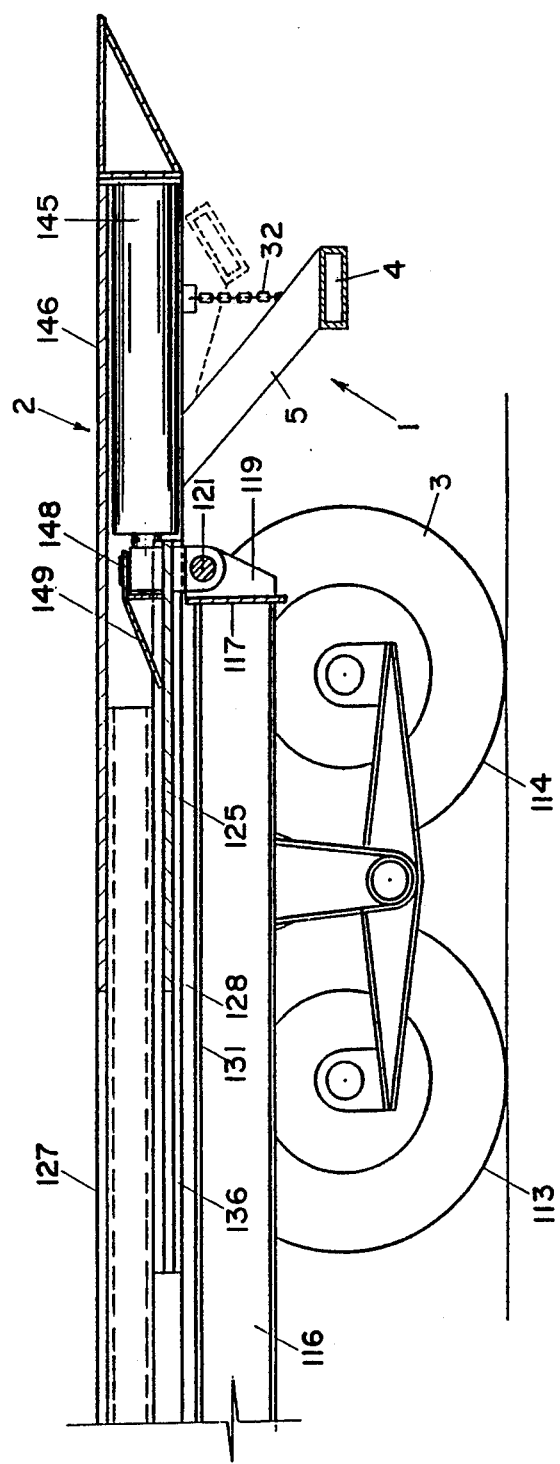
FIG. 8 is a sectional view taken along line VIII—VIII of FIG. 7.

As can be seen in FIG. 8, the car catcher apparatus 2 is shown in solid lines in its downwardly - pivoted, operative, "car-stopping" position as it would be during normal highway transport, and in dashed lines as it would be during a container loading or dumping operation as will be described in more detail hereinafter with regard to FIGS. 10, 13, 14 and 16.

Figure 7:
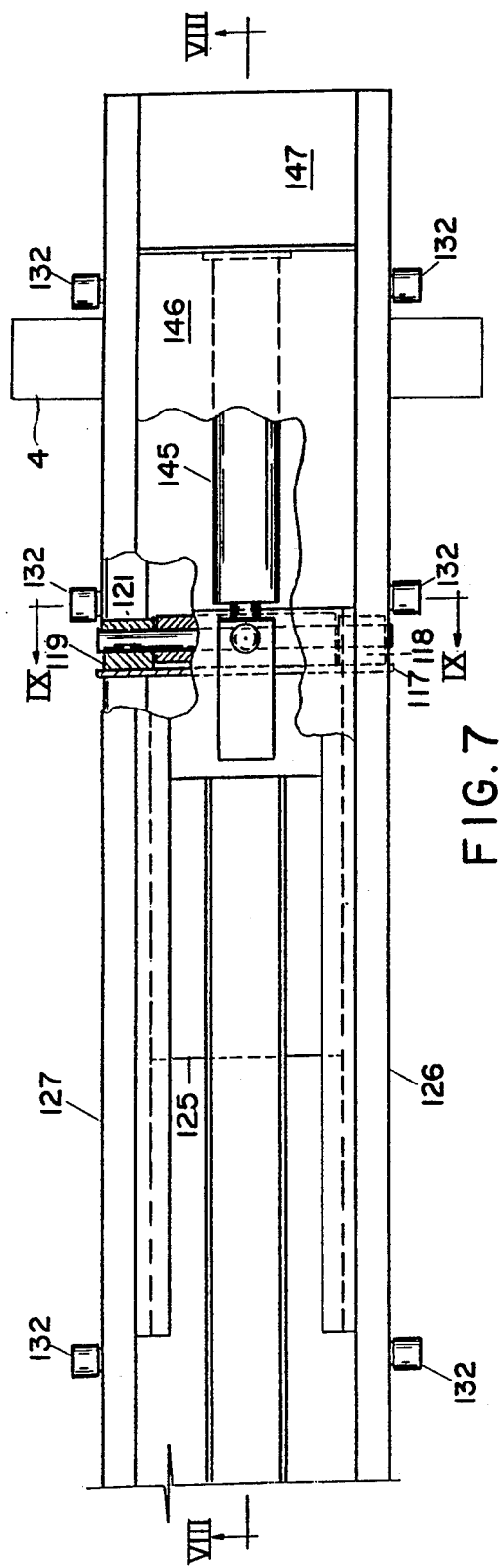
FIG. 7 is a plan view, partly in section, of the aft portion of the hoist structure depicted in FIG. 5 shown carrying the car catcher of the present invention.
Figure 9:
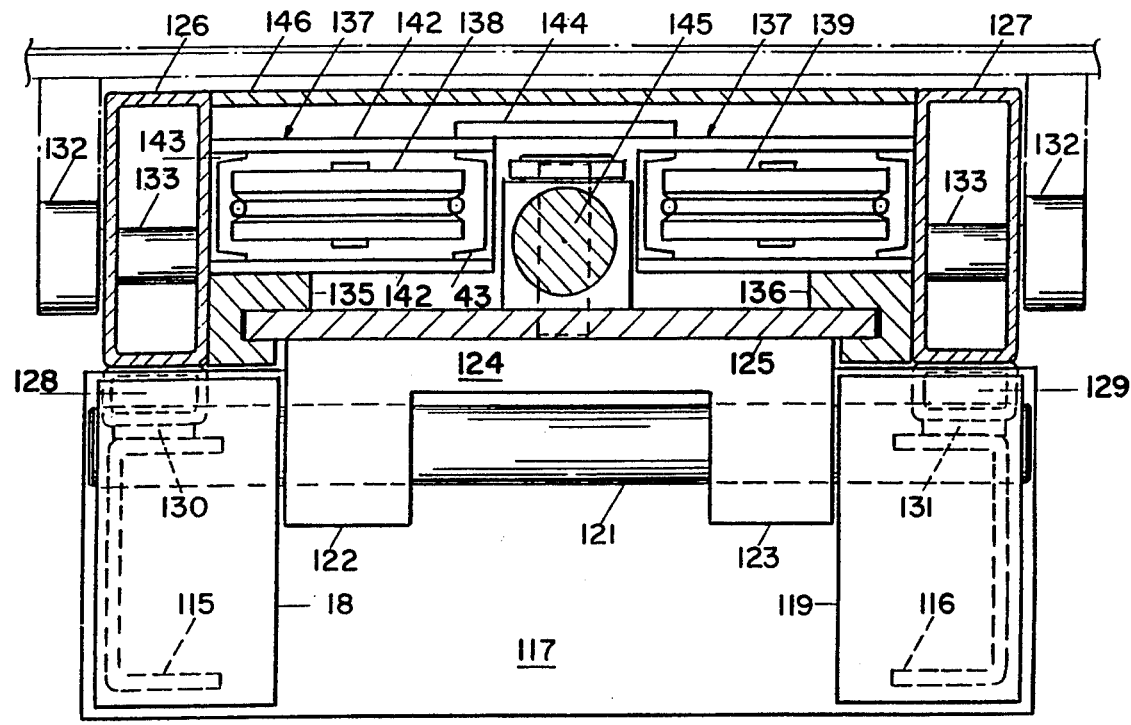
FIG. 9 is a sectional view taken along line IX—IX of FIG. 7.

Hoist rails 126 and 127 are parallel with and generally overlie frame members 115 and 116, respectively, of the vehicle but interposed therebetween are sub-frame members 128 and 129 and spacers 130 and 131, respectively. The spacers 130 and 131 facilitate assembling of the roll-off hoist on the frame of a vehicle. The spacers are welded to the vehicle frame and to the sub-frame members 128 and 129 during assembly. At each spaced-apart location on the outside of the rails 126 and 127 there is, as shown in FIGS. 5, 7 and 9, a roller 132 supported on an arbor 133 to engage with rails of the understructure of a roll-off container. Cross braces 134 tie the rails 126 and 127 together to prevent their movement toward or away from each other.

As shown in FIG. 9, opposite lateral sides of the slide carrier 125 are received in elongated slots of guides 135 and 136, each having a U-shaped cross section. The opposite sides of the carrier 125 contain the rails 126 and 127 to slide the forward or aft direction of the vehicle chassis. The guides are welded to the hoist frame rails 126 and 127 beneath housing assemblies 137. The housing assemblies form two longitudinal chambers to slidably receive sheave blocks 138 and 139 that are clevis—mounted on the rod ends of winch cylinders 140 and 141, respectively, as shown in FIG. 5. Each housing assembly 137 is comprised of upper and lower plates 142 welded to spaced-apart channel members 143. Each of the sheave blocks 138 and 139 is supported by an arbor between clevis plates so that the sheave can rotate about a vertical axis. A tie plate 144 interconnects the plates 142 at the top of the housing assemblies and forms an elongated chamber therebetween wherein the rod end of a piston and cylinder assembly 145 is protectively housed when the piston is extended from the cylinder portion thereof. A guard plate 146 extends between the frame rails 126 and 127 above the housing assemblies 137 and from a ramp 147, which is welded to the frame rails 126 and 127, to a point forwardly beyond the hinge pin 121. The plate extends forwardly along the hoist to protectively cover the piston and cylinder assembly 145, when fully extended, to prevent damage that might otherwise occur in the event of a derailment of a container during loading and unloading operations on the hoist. The cylinder portion of assembly 145 is flange-mounted to an end wall of a cross-member forming ramp 147. The rod end of the assembly 145 is mounted by a clevis pin 148 extending through a clevis end of the piston rod and through a clevis support 149 which is secured to the slide carrier 125. A cable 150 is anchored at one end to a hoist rail and trained about a system of pulleys that includes sheave blocks 138 and 139 in a manner, per se, known in the art, so that a hook 150A on the free end of the cable can be drawn along the length of the hoist rails.

Hoist frame rails 126 and 127 extend from the ramp 147 forwardly beyond the plane of the pivot shaft along the sub-frame on the chassis frame to a point that is about 6 inches from the back of the driver's cab. Connected to the sides of the forward portion of the hoist frame rails are the rod ends of piston and cylinder assemblies 151 and 152 which are pivotally mounted at their cylinder ends by brackets to the chassis frame of the vehicle. The piston and cylinder assemblies 151 and 152 link the forward portion of the hoist rails to the chassis frame so that the rails jut from the vehicle for loading or unloading a container. As shown in FIG. 5, a tank 153 for hydraulic fluid is supported by brackets extending laterally from a side of the vehicle frame. A pump is connected by a drive shaft to a power take-off drive of the vehicle propulsion system in a manner, per se, well known in the art. The pump delivers hydraulic fluid through a plurality of reversing control valves for separate and controlled delivery to piston and cylinder assemblies 140, 141, 145, 151 and 152.

Figure 11:
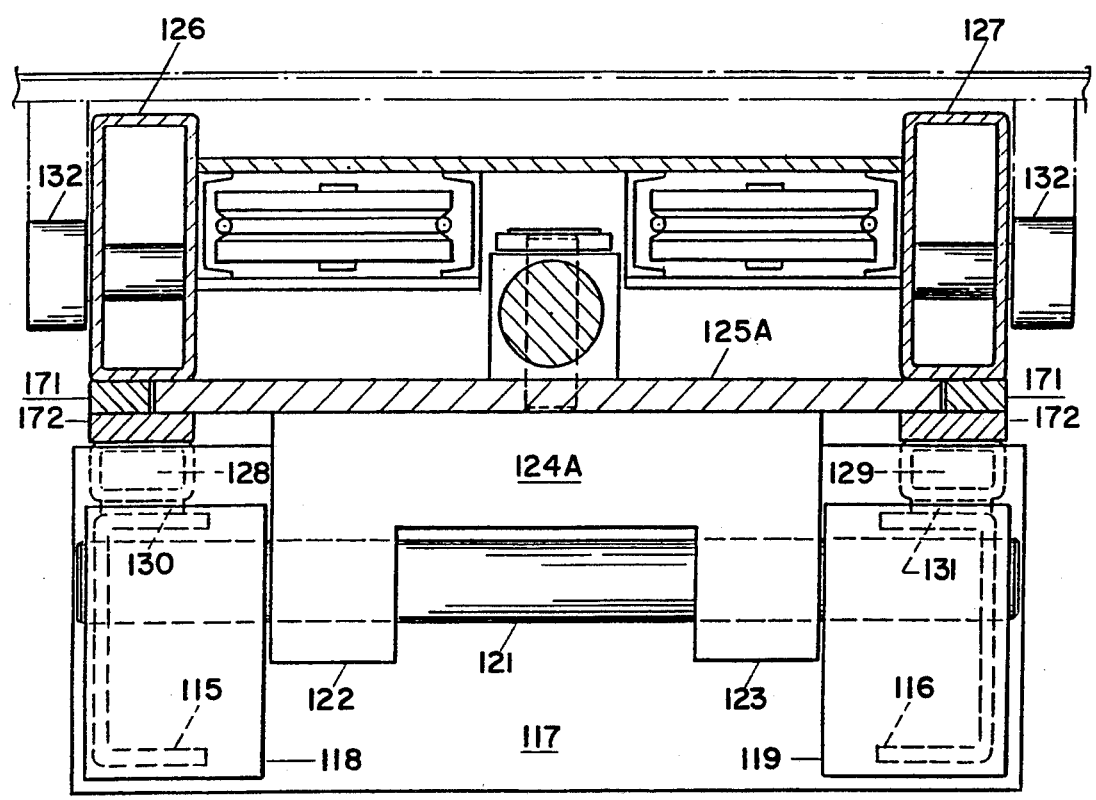
FIG. 11 is a sectional view similar to FIG. 9 but illustrating a variation of the roll-off hoist structure depicted in FIG. 5.
Figure 12:
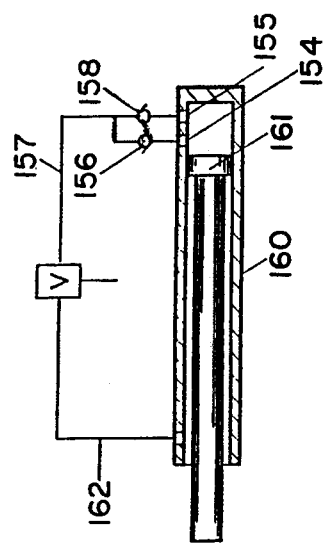
FIG. 12 is a schematic view of an arrangement of check valves which form a cushion for the hoist structure lift cylinder.
Figure 10:
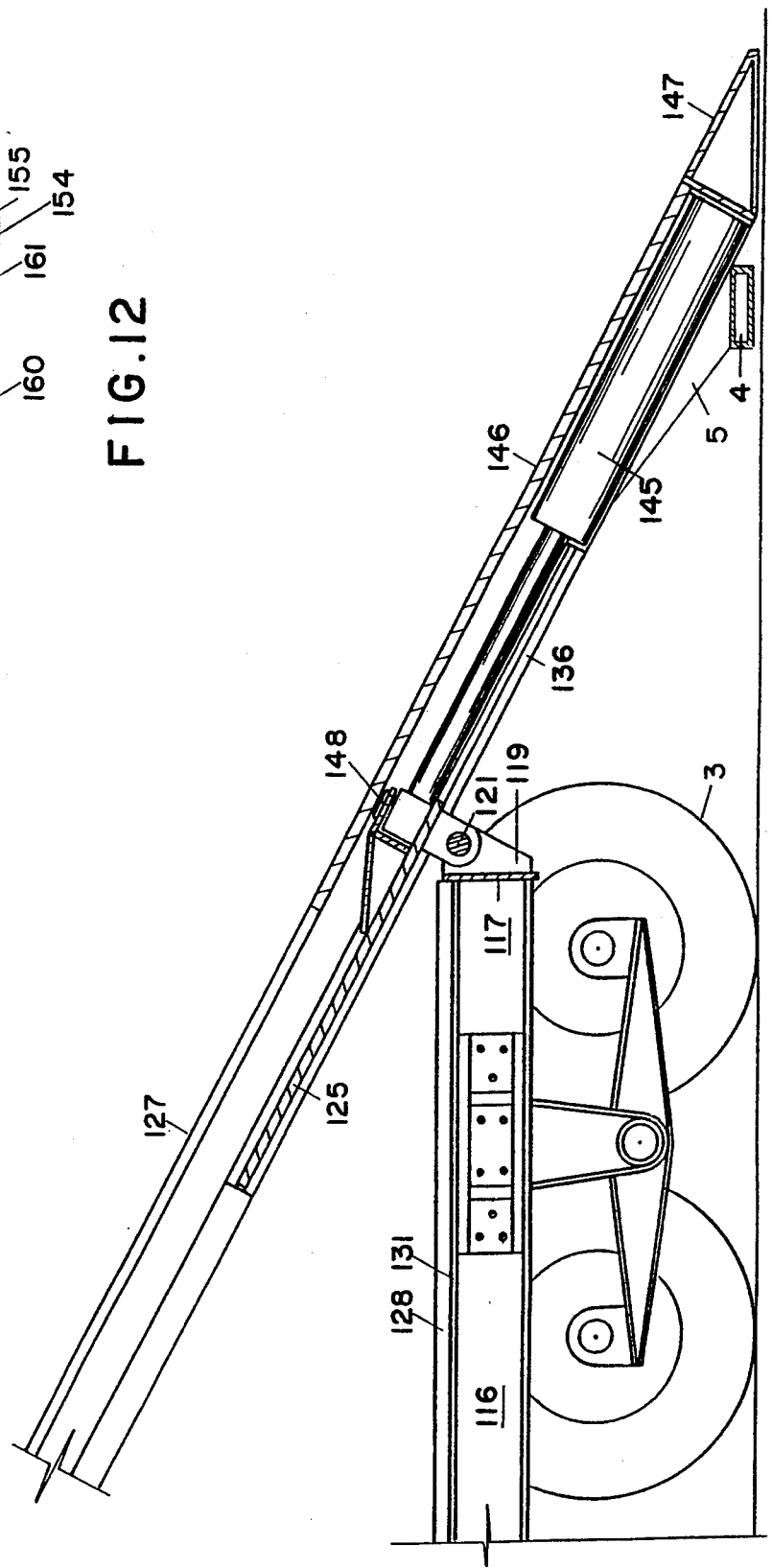
FIG. 10 is a sectional similar to FIG. 8 but illustrating the rear portion of the hoist structure FIG. 5 in a position for receiving or unloading a container and illustrating the car catcher of the present invention in an inoperative position.

A modification to the roll-off hoist is shown in FIG. 11. In FIG. 11, the reference numerals which are the same as reference numerals previously identified, are used to identify the same parts. The modification shown in FIG. 11 provides that a slide carrier 125A has a greater width than slide carrier 125 (FIG. 9) so as to extend midway of the width of the hoist frame rails 126 and 127 in gaps formed by spacer strips 171. The strips are welded to rails 126 and 127, as shown, and to keeper plates 172 to form guide pockets to permit sliding of the hoist frame rails along opposite sides of the slide carrier 125A. The keeper plates 172 are supported on the sub-frame members 128 and 129 which are secured to the chassis frames 115 and 116 as previously described. Hinge bar 124A is welded to the slide carrier 125A in the same manner as hinge bar 124 is weld to carrier 125. The hinge bar 124A includes the downwardly-extending lugs 122 and 123 and engage pivot 121.

To avoid damage to the piston and cylinder assemblies 151 and 152, a cushion of hydraulic fluid is always maintained between the cylinder end and the piston in each of these assemblies. As shown schematically in FIG. 12, each of the assemblies 151 and 152 has two ports 154 and 155 formed at spaced-apart locations closely adjacent the end wall of the cylinder 160. Port 154 is connected by a check valve 156 to a hydraulic supply line 157 having a branch portion which is connected by a check valve 158 to port 155. When a piston 161 is retracted along the cylinder by the introduction of hydraulic fluid through line 162 into the cylinder at the rod end thereof, hydraulic fluid is exhausted from the cylinder end portion through port 154 and thence through the check valve 156 until the piston passes beyond port 154. Hydraulic fluid can no longer be exhausted from port 154. Port 155 is blocked against exhausting of hydraulic fluid by the check valve 158. This prevents depletion of a small but effective volume of hydraulic fluid between piston 161 and the end wall of the cylinder 159 which cushions the piston against contact with the cylinder. When it is desired to extend the piston from the cylinder, fluid is admitted to the cylinder through line 157 beyond check valve 158 and through port 155.

Figure 6:
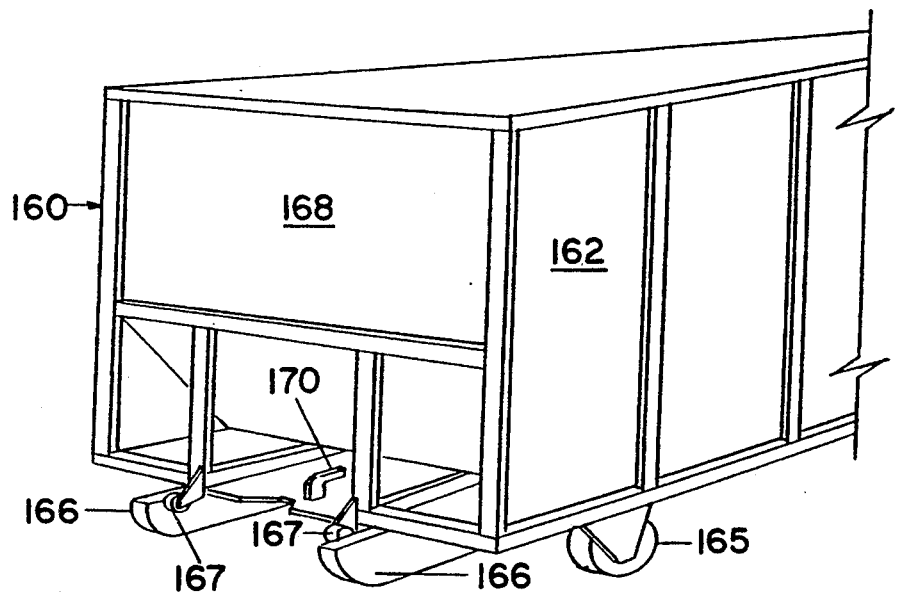
FIG. 6 is a perspective view of a roll-off container for use with the hoist structure depicted in FIG. 5.

In FIG. 6 there is illustrated the forward end portion of a roll-off container 160 of the type which is suitable for loading and unloading onto a vehicle through the use of the roll-off hoist. The container is, per se, known in the art and may take the form of a container disclosed in U.S. Pat. No. 4,372,726. The container includes upstanding side walls 162, a floor wall 163 and a roof wall 164. The container is elongated and wheel assemblies 165 are provided at the four corners of the floor wall to support the container on the ground between the wheels, the floor supports downwardly-extending rails 166 that extend the entire length of the container. A floor plate extends between these rails. The rails 166 extend forwardly beyond a front end wall 168 of the container where they support guide rollers 167 employed to facilitate entry and discharge of the forward portion of the container onto and from the hoist on a vehicle. On the floor wall between the rails 166 is a hook 170 to which can be secured to the free end of a winch cable.

Figure 13:
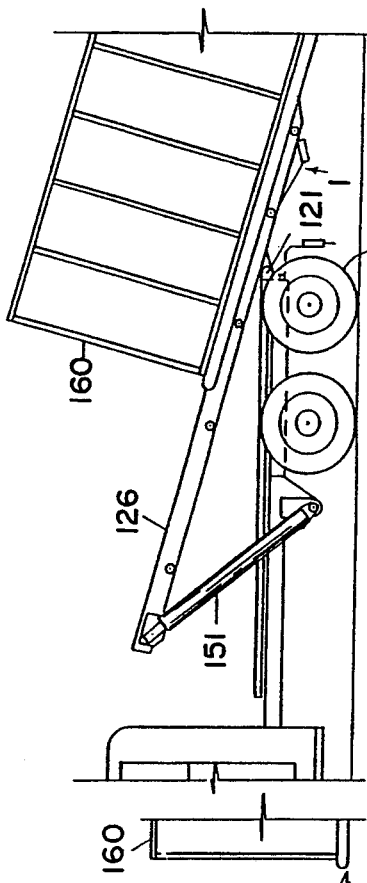
FIGS. 13-15 illustrates successive positioning of the hoist structure of FIG. 5 to load a container at ground level onto a vehicle and the positioning of the car catcher of the present invention throughout the loading process.

As shown in FIG. 13, the roll-off hoist is positioned to receive a roll-off container by delivering hydraulic fluid to piston and cylinder assembly 145 which juts the hoist frame rails rearwardly along the slide carrier. As the forward portion of the hoist frame extends upwardly from the aft portion of the vehicle, the portion of the frame over-hanging the pivot shaft 121 and carrying car catcher apparatus 1 descends toward the ground. As can be seen from FIGS. 8, 13 and 14, the car catcher 1 is first fully pivoted to its uppermost inoperative position so that it does not preclude any downward pivotal descent of the rearwardly-protruding structure 2 of slide carrier frame 125. And, as most clearly illustrated in FIG. 10, complete downward pivoting of the rearwardly-protruding structure 2 is permitted when the car catcher 1 is in its inoperative position to thereby preserve complete operability of the roll-off hoist.

Figure 15:
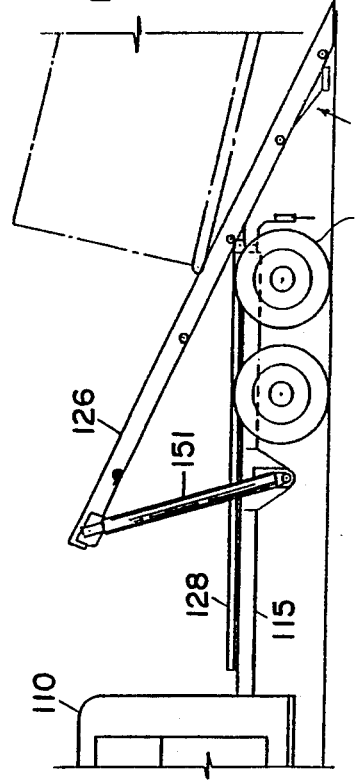
Figure 14:
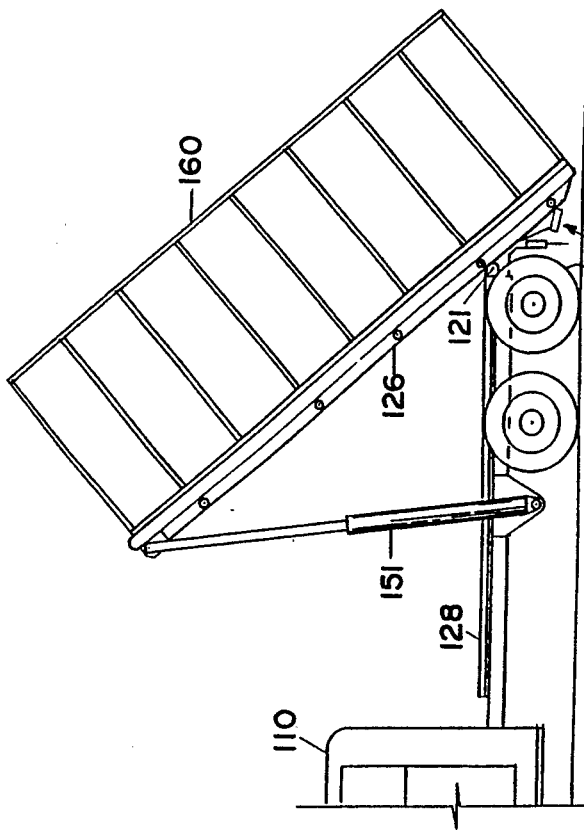

The control valves for piston and cylinder assemblies 151 and 152 are placed or remain in a position so that hydraulic fluid is not supplied to either end of the piston but a cushion of hydraulic fluid is trapped and remains between the pistons and the cylinders thereof. This prevents damaging metal-to-metal contact between the pistons and cylinders under the load imposed thereon as the hoist rails swing about the linkage provided by assemblies 151 and 152. The movement of the hoist rails continues until the ramp 147 engages the ground at a point that is closely adjacent the forward portion of the container. The cable 150 of the winch is then paid-out so that a hook 150A can be engaged with the hook 170 on the container. The winch cylinders 140 and 141 are operated to draw the container toward the hoist so that the slide bar 167 of the container engage and slide along the rollers 132 supported by rails 126 and 127 of the hoist. Continued operation of the winch draws the container along the hoist rails to a position which is generally indicated by phantom lines in FIG. 13. Thereafter, as shown in FIG. 14, the hoist rails are repositioned on the vehicle into an intermediate position by retracting the hoist rails onto the vehicle by operation of piston and cylinder assembly 145. The hoist rails are moved to a generally parallel relation with the rails of the container whereupon the winch is again operated to draw the container along the hoist rails. Concurrently therewith, if desired, the piston and cylinder assembly 145 is operated to slide the hoist rails forwardly along the vehicle into a position where the hoist rails are wholly supported on the chassis frame of the vehicle as shown in FIG. 15. The winch is operated to draw the container forwardly on the hoist rails to a point where stop 171

(FIG. 5) at the forward portion of the hoist engages with the rollers 167 on the forward portion of the container. Conventional latches may be set to interconnect the container with the hoist rails. The container can then be transported by the vehicle. During such transport, as mentioned previously and as seen in FIGS. 8 and 15, the car catcher apparatus is lowered to its operative position.

The container can be unloaded from the vehicle at a desired site by operating the piston and cylinder assembly 145 to jut the hoist rails rearwardly of the vehicle frame while the forward portion of the hoist rails swings upwardly about the piston and cylinder assemblies 151 and 152 which are supplied with hydraulic fluid. The car catcher 1 is pivoted upwardly to its inoperative portion and the hoist rails are swung from a position shown in FIG. 15 to a position shown in FIG. 13. The winch cylinders are then operated to pay-out cable which permits the container to slide on rollers 132 along the hoist rails until the wheels at the rear of the container engage the ground. The forward portion of the container may slide rearwardly along the hoist rails and into engagement with the ground. If necessary, the vehicle can be advanced forwardly after the rear wheels of the container engage the ground in the event the container does not move under gravity from the hoist. The winch will be used to control rearward sliding movement of the container along the hoist rails.

Figure 16:
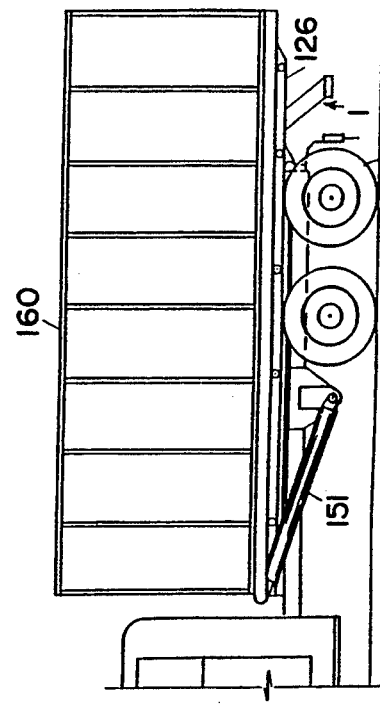
FIG. 16 is a view illustrating a container dumping position of the hoist structure depicted in FIG. 5 and the positioning of the car catcher of the present invention to an inoperative position during such dumping operation.

In FIG. 16, the roll-off hoist is shown in a position in which a roll-off container on the hoist is positioned for dumping material from the aft end of the container. Such a dumping operation is typically carried out at a land-fill area or other preselected dump site. Upon arrival at the dump site, the hoist of the present invention and container supported thereby are situated on the chassis of a vehicle as shown in FIG. 15. Sometimes a rear door is hinged to the container and it is swung to an open position. Again, the car catcher 1 is pivoted upwardly to its inoperative position. Then, hydraulic fluid is supplied to the piston and cylinder assemblies 151 and 152 which lift the forward end of the hoist and container supported thereon about pivot 121 at the aft portion of the vehicle. The hoist is swung in this manner to the position shown in FIG. 16 in which the pistons are fully extended from the cylinders. Normally, for example, the forward end of the hoist is swung to an elevation that is at least 17 feet above ground level. The piston and cylinder assembly 145, however, is not energized while the container is swung into the dumping position. A further feature is that after the container is swung into the position shown in FIG. 16, the piston and cylinder assembly 145 can be operated so that the piston moves in a back and forth direction along the cylinder with very short strokes, e.g., one-half inch, and with abrupt changes in direction by the operation of the control valves. This procedure will shake loose any tightly-compacted material in the container.

While the preferred embodiment of the present invention is the car catcher used in combination with the roll-off hoist structure depicted in FIGS. 5–16, it is contemplated, as mentioned at the outset, that the car catcher apparatus may be used in combination with essentially stationary and simple elevated structure such as a truck chassis, flatbed, or the like. When used with such structure, the car catcher may be conveniently retracted to provide ready access to the rear portions of the vehicle for maintenance thereof.

While the present invention has been described in accordance with the preferred embodiments of the various figures, it is to be understood that other similar embodiment may be used or modifications and additions may be made to the described embodiment for performing the same functions of the present invention without deviating therefrom. Therefore, the present invention should not be limited to any single embodiment but rather construed in breadth and scope in accordance with the recitation of the appended claims.

We claim:

1. The combination of a frame structure having first and second end portions and apparatus for substantially preventing passage of a first vehicle under said second end portion when said frame structure is at a first substantially horizontal position, said frame structure being mounted to a second vehicle and said second end portion protruding rearwardly beyond rear wheels of said second vehicle, said combination comprising:

means mounted to said second vehicle for vertically pivoting said frame structure about a horizontal axis between said first substantially horizontal position and a second position in which said first end portion is upwardly inclined relative to said means for vertically pivoting and said second end portion is downwardly inclined relative to said means for vertically pivoting;

frame means attached to said second end portion for support by the second end portion, said frame means including a jam lock;

means for positioning said frame means into an operative position and an inoperative position, said means for positioning including a pivotal latch lever moveable by an actuator to position said frame means either into said operative position wherein said pivotal latch lever operatively confronts said jam lock or said inoperative position wherein said pivotal latch lever is remote to said jam lock; and chain means interconnecting said frame structure at said second end thereof and said frame means, said chain means and said pivotal latch lever when operatively confronting said jam lock maintaining said operative position and transmit collision impact energy imparted thereto by said first vehicle into said frame structure of said second vehicle.

2. The combination according to claim I further including stop means for controlling a position of said pivotal latch lever relative to said jam lock whereby at such time when said frame structure is in said first position and said frame means is in said operative position, said chains and the confronting relation between the pivotal latch lever and jam lock controlled by said stop means operates in said operative position to substantially prevent movement of said frame means from said operative position by occurrence of a collision between said first and second vehicles, said frame means when positioned into said inoperative position permitting full downward inclination of said second end portion such that a distal end thereof is capable of being positioned substantially at ground level.

3. The combination according to claim 2 wherein said pivotal latch lever defines a sidewall lying in a plane forming an acute angle with a plane passing through a pivot axis for said pivotal latch lever and a corner edge between said sidewall of the lever and an end face of the lever, said end face of the lever being engageable with said jam lock and said sidewall being engageable with a stop block for establishing an operative position of said frame means.

4. The combination according to claim 3 wherein said angle is between 1 and 5 degrees.

5. The combination according to claim 1 wherein said stop means includes discrete stops of which a first stop engages said pivotal latch lever to establish the confronting relation between said jam lock and said pivotal latch lever and the second stop functions to establish said inoperative position.

6. The combination according to claim 5 wherein said stops are engagable with opposite lateral sides of said pivotal latch lever.

7. The combination according to claim 1 wherein said actuator is pivotally connected at one end to said frame means and pivotally connected at an opposite end thereof to said pivotal latch lever.

8. The combination according to claim 5 wherein said first stop is supported by said frame structure.

9. The combination according to claim 5 wherein said second stop is supported by said frame means.

10. The combination according to claim 1 wherein said frame structure includes a roll-off hoist.

* * * * *